Patented May 24, 1938

2,118,039

UNITED STATES PATENT OFFICE 2,118,039

MANUFACTURE OF CELLULOSE

Henry Dreyfus, London, England

No Drawing. Application April 16, 1935, Serial No. 16,623. In Great Britain May 16, 1934

1 Claim. (Cl. 92—13)

This invention relates to improvements in the manufacture of cellulose from wood, straw and similar ligno-cellulosic materials, and especially from wood pulps.

In the pulping of ligno-cellulosic materials such as wood, and in the purification of wood pulps, the materials or pulps are in many cases treated with solutions of alkalies or alkaline substances, for example solutions of caustic soda and/or sodium sulphide. It is a disadvantage of such processes that the alkaline solutions are very liable to attack and degrade the cellulose. For instance, when treating wood pulps with alkaline solutions to remove residual lignin, pentosans and other encrusting substances, attack of the cellulose can only be overcome by a very careful regulation of the conditions.

I have now found that this attack and degradation of the cellulose may be considerably reduced or even eliminated if the alkaline solutions employed in the treatment of the wood pulps contain already a substance resulting from the action of an alkali on a ligno-cellulosic material. By adopting this procedure cellulose of substantially improved properties may be obtained from wood pulps.

In accordance with the present invention, therefore, wood pulps and similar cellulosic materials which still contain some lignin, pentosans and/or similar encrusting materials are treated with an alkaline liquor, for example caustic soda and/or sodium sulphide, which already contains a substance resulting from the treatment of a ligno-cellulosic material with alkali or an alkaline reagent.

The protecting substances may be introduced into the alkaline solution in any desired manner. Preferably wood is actually treated with a caustic soda or other strongly alkaline solution and the concentration of the resulting solution adjusted to that required for the treatment of the wood pulp. Such a solution may be used repeatedly for the treatment of fresh batches of pulp, the concentration being adjusted for each batch to the desired value. The protecting substances may, if desired, be introduced into or taken up by the alkaline solution while the latter is in contact with the materials being treated; for example there may be mixed with the chemical wood pulp to be treated a wood powder or wood paste made from raw wood or a mechanical wood pulp, so that the alkali acts upon the wood substance to form the solution of the desired concentration in the presence of the wood pulp undergoing treatment. Thus, for example, a chemical wood pulp may be mixed with 2-5 or 10% of its weight of raw wood powder or paste prior to treatment with alkali. It is preferable, however, to constitute the solution containing the protecting substances prior to bringing it into contact with the chemical wood pulp.

The process of the present invention may be applied to the treatment of raw wood, although the improvement in the quality of the cellulose does not in this case appear to be so pronounced as when treating wood pulps such as sulphite pulps, soda pulps, sulphate pulps, and pulps obtained by extracting lignin from wood by means or organic solvents or solvent compositions, e. g. alcohol-water or alcohol-benzene-water mixtures. All such pulps are referred to in this specification as chemical pulps, in contradistinction to mechanical pulps, in which the lignin content is substantially that of the original wood.

Any suitable concentrations, temperatures and other conditions may be used for the alkaline treatment in accordance with the present invention. Thus, for example, the chemical wood pulp or other cellulosic material containing lignin, pentosan, etc. may be treated with cold, moderately strong alkali, for example a caustic soda of 15-20% strength. Preferably, however, the treatment is with moderately hot or hot or boiling solutions of alkali of lower concentrations, and especially concentrations of caustic soda and/or sodium sulphide of under 5%, for example 1½-3½%. The treatment with such dilute alkali may be relatively vigorous, for example it may be carried out at the boiling point of the alkali solution at atmospheric pressure or may be carried out under pressure either at the boil or below the boil, for example at temperatures of 100-130° C. It is particularly advantageous to employ such dilute alkali under a pressure in excess of the vapour pressure of the solution at the temperature obtaining. Thus, for example, pressures of 6-10 atmospheres in excess of the vapour pressure of the solution may be employed at temperatures of 100-130° C.

The cellulosic material may be subjected to a two-fold treatment with alkali, first with dilute alkali at elevated or moderately elevated temperatures and under atmospheric pressure or superatmospheric pressures, and then with cold stronger alkali, for example of 15-20% strength.

The treatments described above are suitable for treating woods of various kinds, and especially for treating wood pulps derived therefrom. The more resistant woods such as spruce wood, as well as pulp therefrom, may if desired be subjected to somewhat more vigorous conditions than those specified.

The cellulose prepared by the present processes may be utilized for any desired purpose, for example for the manufacture of cellulose derivatives or for the manufacture of paper or other products comprising fibrous cellulose. For these purposes it may be subjected to any desired treatments such as a chlorine bleach or any other bleaching treatment. It is, however, of especial value in the manufacture of cellulose derivatives.

For the manufacture of organic esters of cellulose with the aid of organic acid anhydrides the cellulose is preferably subjected to a pretreatment with an acid, and particularly a lower fatty acid, for example formic acid or acetic acid. Such acids may be applied in small or large quantities and in liquid or vapour form. Similarly, pretreatments with mineral acids, for example hydrochloric acid, sulphuric acid or even nitric acid, may be applied, preferably in conjunction with acetic acid or other lower fatty acid; such pretreatments are preferably carried out under conditions of temperature, concentration and quantity of mineral acid, which do not lead to substantial degradation of the cellulose. A pretreatment with a lower fatty acid, for example acetic acid, may be applied in such a way as to introduce into the cellulose the catalyst required for the subsequent acetylation or other esterification. If desired, any mineral acid used during the pretreatment may be neutralized or substantially neutralized before applying the esterifying agent. For further details as to the pretreatments reference is made to my French specification No. 565,654 and my U. S. Patents Nos. 1,831,101 and 1,911,069.

For the manufacture of good quality cellulose ethers and for the manufacture of viscose and other cellulose derivatives in which alkali is present during the conversion to the cellulose derivative, pretreatments with mineral and/or organic acids are in general unnecessary and the cellulose may be subjected directly to the treatment for conversion into the desired cellulose derivative. Similarly, in making nitro-cellulose the nitrating acid may be applied directly to the purified cellulose prepared in accordance with the present invention.

Derivatives of cellulose made from cellulose produced according to the invention may be employed in the manufacture of artificial filaments, yarns, films, foils and other articles, and of lacquers, veneers, moulding powders and other compositions.

The following examples illustrate the invention without in any way limiting it:—

Example 1

Chips of spruce or other wood are treated with about four times their weight of a 10% caustic soda solution at a temperature of about 170° C. for 1 hour, and the solution so obtained is employed as a stock protecting solution.

A poplar sulphite pulp is purified from lignin and pentosans by boiling for 6 hours under a pressure between 1 and 2 atmospheres with about 20 times its dry weight of a solution obtained by diluting the stock solution to a caustic soda concentration of 1.5%. Alternatively, the solution and pulp may be heated to a temperature between 100° C. and 130° C. under a pressure higher than the vapour pressure of the solution, for instance a pressure of 10 atmospheres. The alkaline solution may then be separated from the pulp, and the latter washed and, if desired, subjected to a chlorine or hypochlorite bleaching operation.

Example 2

A pulp obtained from spruce chips by extraction with an alcohol-water mixture is subjected to the treatment described in Example 1, with the exception that the stock solution is diluted to a caustic soda concentration of 2½%, the amount of diluted solution employed being 20 times the dry weight of the pulp.

Example 3

The stock solution described in Example 1 is diluted to a caustic soda concentration of 0.5% and made up, by the addition of solid sodium sulphide or a concentrated solution thereof, to a sodium sulphide concentration of 5%. This solution may be substituted for the caustic soda solutions in Examples 1 and 2.

Example 4

The stock solution described in Example 1 is diluted to give a 2½% caustic soda solution, and the caustic soda concentration is raised to 15% by the addition of a relatively concentrated solution of the alkali. A spruce sulphite pulp is subjected to the action of 10 to 15 times its weight of the 15% alkali solution in the cold for about 8 or 10 hours. The solid products may be washed free from alkali and, if desired, subjected to a chlorine bleach. The alkali solution may, after adjustment of the caustic soda concentration, be employed in the treatment of further quantities of pulp.

Example 5

The process of Example 1 is applied to pulps obtained by the soda process from aspen and from jack pine.

Example 6

The pulps obtained by the treatments described in Examples 1, 2, and 3 are further treated with about 8 times their weight of a 15% caustic soda solution, prepared as described in Example 4, for 6 hours. The pulps are then freed from alkali by drainage and washing, and are treated with three times their weight of glacial acetic acid at 60° C. for 5 hours. This acid treatment may also be applied to the pulps obtained in Examples 1, 2, and 3 if the concentrated alkali treatment is omitted. In either case the product may be subjected to acetylation or other esterification reaction.

Example 7

A poplar sulphite pulp is mixed with 8% of its weight of sawdust or wood powder, either of poplar or of some other wood, and is heated under pressure to 120° C. with 30 times its dry weight of a 3% caustic soda solution for 6 to 8 hours. The product may, if desired, be subjected to the action of a cold concentrated alkali solution, for instance as described in Example 6.

Example 8

Spruce chips are boiled under pressure with 5 times their dry weight of a caustic soda solution prepared by diluting the stock solution of Example 1 to a caustic soda concentration of 5% and adding a concentrated solution of the alkali to bring the concentration up to 8 or 10%; steam is blown in to produce and maintain a temperature of 180° C., and the treatment lasts for 7 hours. The pulp so produced may be subjected to a treatment described in any of the other examples.

What I claim and desire to secure by Letters Patent is:—

1. Process for the manufacture of cellulose, which comprises subjecting chemical wood pulps containing residual lignin, pentosan or other encrusting substances to treatment first with a caustic alkali solution of concentration between 1½ and 5% at a temperature of at least 100° C., and then with a caustic alkali solution of concentration between 15 and 20% in the cold, both of which solutions have been prepared by heating a solution of a caustic alkali of concentration of the order of 10% with a lignocellulosic material and bringing the solution so obtained to the desired alkali concentration.

HENRY DREYFUS.